(12) United States Patent
Herbers (10) Patent No.: US 7,780,122 B1
(45) Date of Patent: Aug. 24, 2010

(54) TELESCOPIC PIPE SUPPORT SYSTEM

(76) Inventor: Charles R. Herbers, 3401 Ridgelake Dr., Apt. 107, Metairie, LA (US) 70002

( * ) Notice: Subject to any disclaimer, the term of this patent is extended or adjusted under 35 U.S.C. 154(b) by 179 days.

(21) Appl. No.: 12/113,357

(22) Filed: May 1, 2008

Related U.S. Application Data (62) Division of application No. 10/962,815, filed on Oct. 12, 2004, now abandoned.

(51) Int. Cl.
*E21F 17/02* (2006.01)
(52) U.S. Cl. .......................... 248/59; 248/58; 248/333
(58) Field of Classification Search ............ 248/354.5, 248/408, 413, 423; 403/24, 108, 326, 379.1
See application file for complete search history.

(56) References Cited

U.S. PATENT DOCUMENTS

| | | | |
|---|---|---|---|
| 3,892,029 A | 7/1975 | Militello | |
| 4,007,563 A | 2/1977 | Nakagawa | |
| 4,018,470 A | 4/1977 | Tye | |
| 4,407,478 A * | 10/1983 | Hodges | ...................... 248/542 |
| 4,429,497 A * | 2/1984 | Dibernardi | ..................... 52/27 |
| 4,807,843 A | 2/1989 | Courtois et al. | |
| 5,050,364 A | 9/1991 | Johnson et al. | |
| 5,107,650 A | 4/1992 | Patrick | |
| 5,118,066 A * | 6/1992 | Perrault et al. | .............. 248/333 |
| 5,228,256 A | 7/1993 | Dreveny | |
| 5,317,850 A | 6/1994 | Colonias et al. | |
| 5,320,439 A * | 6/1994 | Perrault et al. | ........... 403/379.1 |
| 5,730,245 A | 3/1998 | Conway | |

* cited by examiner

*Primary Examiner*—Gwendolyn Baxter
(74) *Attorney, Agent, or Firm*—John D. Gugliotta, PE, Esq (57) ABSTRACT

A telescopic pipe support system is provided for supporting a plurality of pipes. The pipe support system utilizes an elongated, tubular shaft adapted to be mounted atop and below wood flooring as well as below concrete decking via a shaft receiving anchor and an auxiliary anchor, respectively. Hanger elements are removably attached along various longitudinal positions of the shaft in order to quickly and easily support construction articles.

17 Claims, 8 Drawing Sheets

TELESCOPIC PIPE SUPPORT SYSTEM

RELATED APPLICATIONS

The present invention is a divisional application of U.S. patent Ser. No. 10/962,815 filed on Oct. 12, 2004 now abandoned, incorporated by reference herein.

BACKGROUND OF THE INVENTION

1. Field of the Invention

The present invention relates generally to deck anchors and, more particularly, to a telescopic pipe support system.

2. Description of the Related Art

In the construction industry, buildings and passages such as roadways and bridges which utilize poured concrete construction and wood pose particular problems when installing deck anchors for supporting a variety of fixtures such as safety cable, piping, ductwork, lighting, and other construction materials. In buildings using poured concrete decking, each floor is built by constructing frameworks of columns, posts, jacks, and horizontal beams on a lower floor, and laying flooring atop such lower flooring, and often pouring concrete there atop so as to form a reinforced concrete floor. Typically, anchor supports are connected to the decking to allow these fixtures to be suspended from the decking. The prior art discloses various decking anchors and anchor means designed to facilitate this purpose. However, the prior art has failed to address the need for a lightweight pipe support system which can be quickly and easily installed in concrete or wood, which is telescopic, and which allows for a multitude of construction articles to be supported in a vertically-oriented, space-saving manner.

Accordingly, a need has arisen for a lightweight, rigid pipe support system which can be easily and quickly mounted atop and below wood flooring or concrete decking which is adapted to provide for a multitude of telescopic adjustment capabilities in a manner which is quick, easy, and efficient. The development of the telescopic pipe support system fulfills this need.

A search of the prior art did not disclose any patents that read directly on the claims of the instant invention; however, the following references were considered related.

U.S. Pat. No. 5,730,245 issued in the name of Conway describes a safety cable deck anchor that is removable.

U.S. Pat. No. 5,317,850 issued in the name of Colonias et al. discloses an offset anchor bolt and method of orientation.

U.S. Pat. No. 5,228,256 issued in the name of Dreveny describes an anchor means for use with metal decking.

U.S. Pat. No. 5,107,650 issued in the name of Patrick discloses anchorages in composite steel and concrete structural members.

U.S. Pat. No. 5,050,364 issued in the name of Johnson et al. describes a two-part anchor bolt holder.

U.S. Pat. No. 4,807,843 issued in the name of Courtois et al. discloses a recess plug for precast concrete panel.

U.S. Pat. No. 4,018,470 issued in the name of Tye discloses an anchor bolt for embedment in a concrete slab.

U.S. Pat. No. 4,007,563 issued in the name of Nakagawa describes a deck anchor for securing in a hole in a metal plate in concrete building structures.

U.S. Pat. No. 3,892,029 issued in the name of Militello discloses a metal decking punch and method.

Consequently, a need has arisen for a lightweight, rigid pipe support system which can be easily and quickly mounted atop and below wood flooring or concrete decking which is adapted to provide for a multitude of telescopic adjustment capabilities in a manner which is quick, easy, and efficient.

SUMMARY OF THE INVENTION

Therefore, it is an object of the present invention to provide a pipe support system adapted to support a plurality of pipes.

It is another object of the present invention to provide a pipe support system being telescopic.

It is another object of the present invention to provide a pipe support system being easily and quickly mounted atop and below wood flooring or concrete decking.

It is another object of the present invention to provide a lightweight and rigid pipe support system.

It is another object of the present invention to provide a shaft receiving anchor in order to vertically support a shaft atop wood flooring, or in a suspended manner therebelow.

It is another object of the present invention to provide a pipe support system which provides user with a multitude of telescopic adjustment capabilities.

It is another object of the present invention to provide an auxiliary anchor in order to vertically support the shaft in a suspended manner below prepoured concrete decking.

It is another object of the present invention to provide hanger elements being quickly and easily attached to the shaft in order to allow for quick and easy support of construction articles such as pipes.

It is still another object of the present invention to provide a clevis hanger adapted for removable attachment to the bottom end of shaft.

Briefly described according to one embodiment of the present invention, a telescopic pipe support system is provided for supporting a plurality of pipes. The telescopic pipe support system is comprised of an elongated tubular shaft having a generally square configuration. The shaft is constructed of a suitably rigid, material. The shaft includes a plurality of foramens extending through the sidewalls thereof being vertically aligned along an elongated centerline thereof, in a spaced orientation. Foramens of a first two opposing sidewalls are positioned in horizontal alignment, but are aligned so as to be staggered or offset with respect to foramens of a second two opposing sidewalls. It is envisioned that alternatively, shaft may be constructed with a J-shaped hook portion molded integrally along the bottom end thereof.

In order to vertically support the shaft atop wood flooring, or in a suspended manner therebelow, a shaft receiving anchor is disclosed. The shaft receiving anchor defines an elongated, tubular shaft receiving sleeve which terminates into a planar base portion. The shaft receiving sleeve is dimensionally-sized so as to slidably receive shaft in a snug and intimate manner. An aperture is formed in each quadrant of the planar base portion, through which a screw is inserted and screwed into wood flooring either thereatop or therebelow as is necessarily required or desired, and thus securely mounting shaft receiving anchor to wood flooring. The shaft receiving sleeve includes a plurality of foramens extending through the sidewalls thereof being vertically aligned along an elongated centerline thereof, in a spaced orientation. Foramens of a first two opposing sidewalls are positioned in horizontal alignment, but are aligned so as to be staggered or offset with respect to foramens of a second two opposing sidewalls. Once inserted within the shaft receiving sleeve, the shaft is locked into a desired vertical position via a pin.

In order to vertically support the shaft in a suspended manner below prepoured concrete decking, an auxiliary anchor is provided. The auxiliary anchor defines an elongated, tubular body portion defining a closed top end joined by four sidewalls extending perpendicularly therefrom which terminate into an outwardly protruding, planar base.

A generally square-shaped central opening is formed within the planar base which provides entrance into a shaft receiving cavity. A pair of springpin receiving cavities are formed approximately midway about sidewalls of body portion. The springpin receiving cavities jointly define a t-shaped configuration. The planar base includes an aperture formed in each quadrant thereof, through which a nail is intended to be driven. An outwardly-biased springpin is suitably disposed perpendicularly through shaft, just below the top end thereof. The top end of shaft is inserted through a concrete opening, through central opening of planar base, and into the shaft receiving cavity, where shoulders of springpin engage the inner sidewalls of body portion facilitating contraction of springpin until reaching springpin receiving cavities, whereupon springpin protracts therein in an enclosing relationship, and thereby removably securing shaft within auxiliary anchor.

In order to allow for quick and easy support of construction articles such as pipes, hanger elements are disclosed. The hanger elements are adapted to be removably attached to the shaft along various longitudinal positions thereof as selected by user.

A clevis hanger is disclosed and adapted for removable attachment to the open bottom end of shaft. Attachment of clevis hanger to shaft is facilitated through the use of a pin.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

1. Detailed Description of the Figures

Referring now to FIGS. 1-7, a telescopic pipe support system 10 is shown, according to the present invention, adapted to support a plurality of pipes 90.

Figure 1:
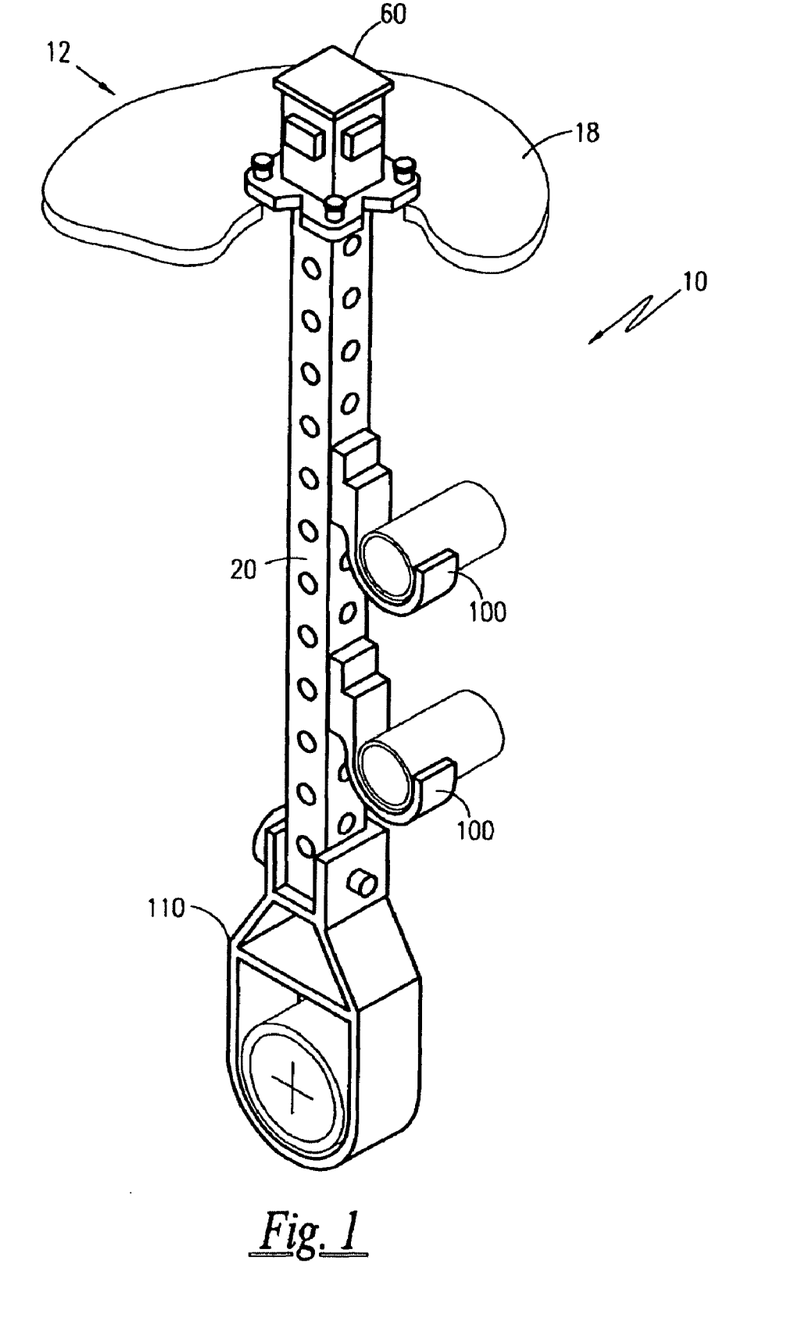
FIG. 1 is a perspective view of a telescopic pipe support system, according to the preferred embodiment of the present invention.
Figure 2:
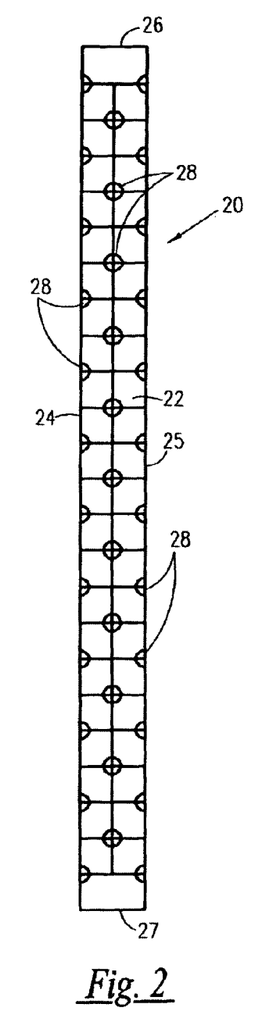
FIG. 2 is a front side elevational view of the shaft, according to the preferred embodiment of the present invention.
Figures 3, 4, 5:
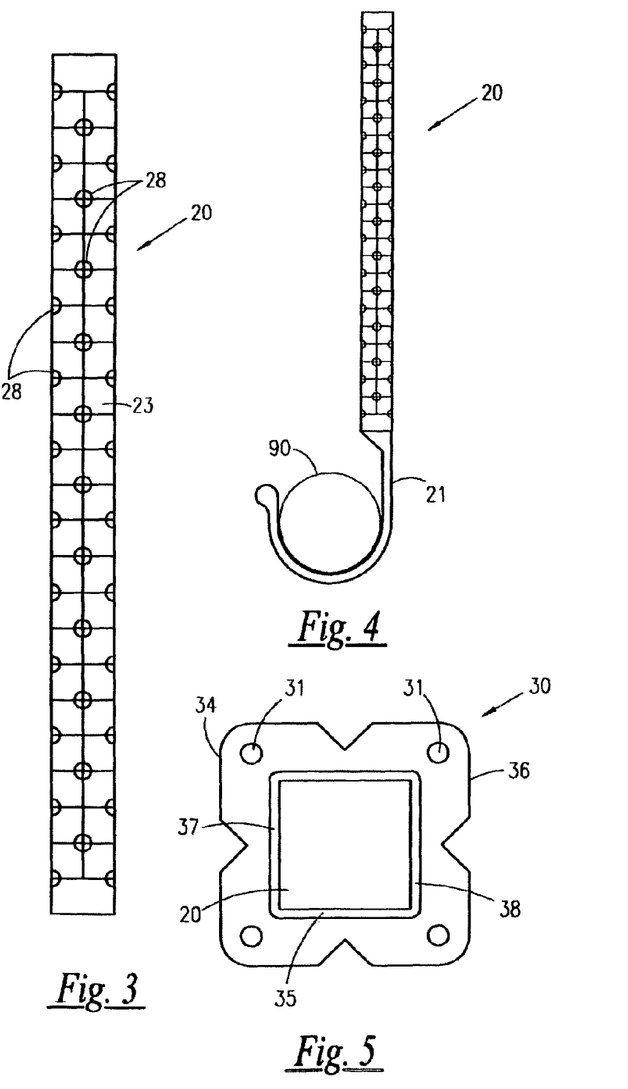
FIG. 3 is rear side elevational view thereof.
FIG. 4 is a left side elevational view of the shaft shown constructed with a J-shaped hook portion, according to the preferred embodiment of the present invention.
FIG. 5 is a top planar view of the shaft receiving anchor, according to the preferred embodiment of the present invention.

The telescopic pipe support system 10 is further adapted to be mounted atop and below flooring 12, wherein flooring 12 includes but is not limited to wood 15 and concrete 18. The telescopic pipe support system 10 is comprised of an elongated tubular shaft 20 having a generally square configuration. The shaft 20 is constructed of a suitably rigid material, for example metal; or a thermoplastic polymer, preferably, polyvinylchloride. The shaft 20 defines a front vertical wall 22 opposing a rear vertical wall 23, a right vertical wall 24 opposing a left vertical wall 25, and an open top end 26 opposing an open bottom end 27. The front vertical wall 22 and the rear vertical wall 23 include a plurality of foramens 28 extending therethrough and vertically aligned along an elongated centerline thereof, in a spaced orientation. Each foramen 28 of front vertical wall 22 and rear vertical wall 23 is positioned in horizontal alignment. The right vertical wall 24 and left vertical wall 25 include a plurality of foramens 28 extending therethrough and vertically aligned along an elongated centerline thereof, in a spaced orientation. Each foramen 28 of right vertical wall 24 and left vertical wall 25 is positioned in horizontal alignment, but are aligned so as to be staggered or offset with respect to foramens 28 of the front vertical wall 22 and rear vertical wall 23.

It is envisioned that alternatively, shaft 20 may be constructed with a J-shaped hook portion 21 molded integrally along the bottom end 27 thereof, as illustrated in FIG. 4.

Figure 6:
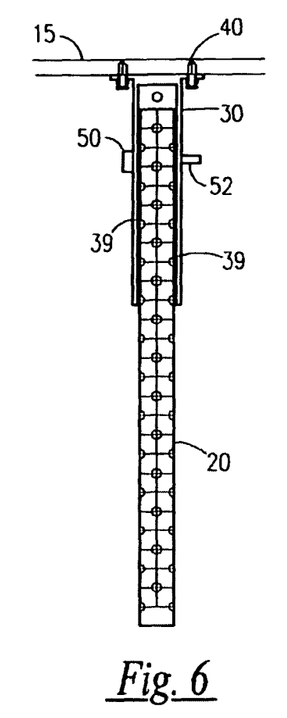
FIG. 6 is a side elevational view of the shaft shown suspended within the shaft receiving anchor, according to the preferred embodiment.
Figure 7:
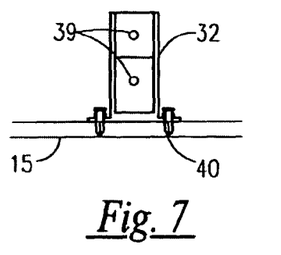
FIG. 7 is a side elevational view of the shaft receiving anchor shown mounted atop flooring, according to the preferred embodiment of the present invention.

Referring more specifically to FIGS. 5-7, in order to vertically support the shaft 20 atop wood flooring 15, or in a suspended manner therebelow, a shaft receiving anchor 30 is disclosed. The shaft receiving anchor 30 is constructed of a suitably rigid material, for example metal, or a thermoplastic polymer, preferably, polyvinylchloride. The shaft receiving anchor 30 defines an elongated, tubular shaft receiving sleeve 32 which terminates into an outwardly protruding, planar base portion 34 having a generally square-shaped configuration. The shaft receiving sleeve 32 is dimensionally-sized so as to slidably receive shaft 20 in a snug and intimate manner.

The shaft receiving sleeve 32 further defines opposing front and rear sidewalls 35, 36 and opposing right and left sidewalls 37, 38. Front and rear sidewalls 35, 36 include a plurality of foramens 39 extending therethrough and vertically aligned along an elongated centerline thereof, in a spaced orientation.

Each foramen 39 of the front sidewall 35 and rear sidewall 36 is positioned in horizontal alignment. Right and left sidewalls 37, 38 include a plurality of foramens 39 extending therethrough and vertically aligned along an elongated centerline thereof, in a spaced orientation. Each foramen 39 of the right sidewall 37 and left sidewall 38 are positioned in horizontal alignment, but are aligned so as to be staggered or offset with respect to foramens 39 of front sidewall 35 and rear sidewall 36.

An aperture 31 is formed in each quadrant of the planar base portion 34, through which a screw 40 is inserted and screwed into wood flooring 15 either thereatop or therebelow as is necessarily required or desired, and thus securely mounting shaft receiving anchor 30 to wood flooring 15.

Once inserted within the shaft receiving sleeve 32, the shaft 20 is locked into a desired vertical position via a pin 50. More specifically, foramens 28 of shaft 20 are selectively aligned with foramens 39 of shaft receiving sleeve 32, and pin 50 is inserted through respective foramens 28, 39, thereby locking shaft 20 in a desired vertical position. The pin 50 includes a spring-biased detent 52 to prevent inadvertent escape during lockage. The design and configuration of the shaft receiving anchor 30 and shaft 20 provide user with a multitude of telescopic adjustment capabilities. The shaft receiving anchor 30 is envisioned to be available in various lengths.

Figure 8:
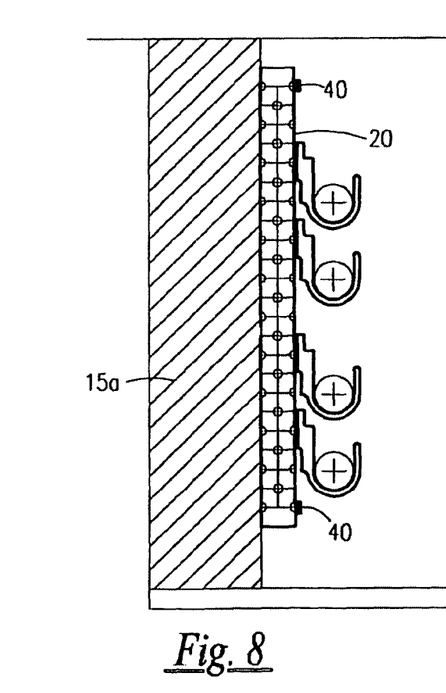
FIG. 8 is a side elevational of the shaft shown adjacently mounted directly against a vertically-oriented surface.
Figure 9:
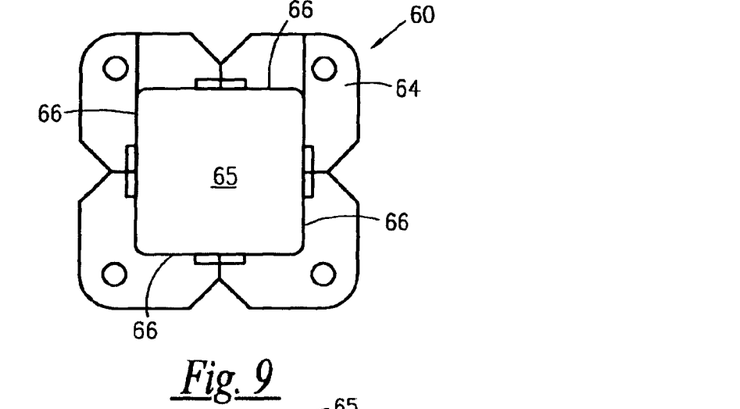
FIG. 9 is a top plan view of the auxiliary anchor, according to the preferred embodiment of the present invention.
Figure 10:
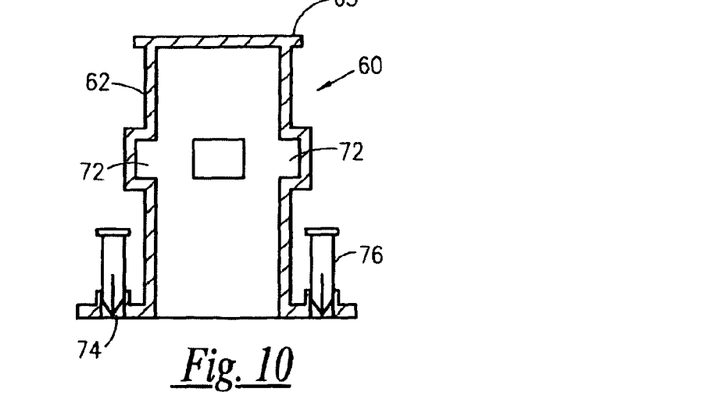
FIG. 10 is a cross-sectional view of the auxiliary anchor, according to the preferred embodiment of the present invention.
Figure 11:
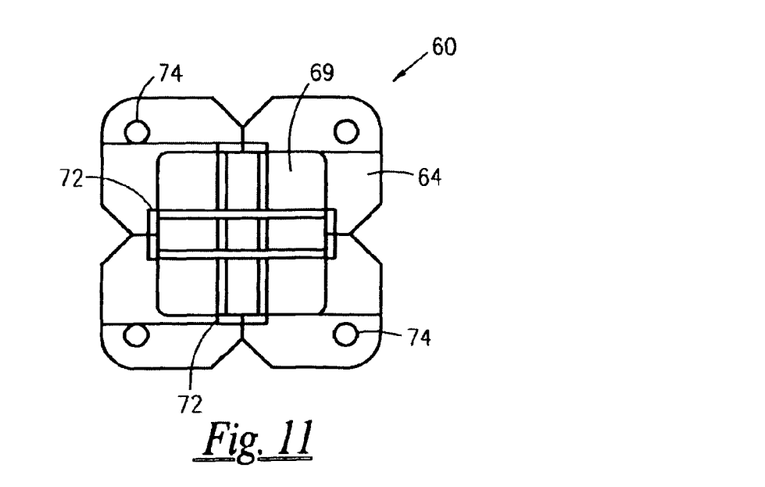
FIG. 11 is a bottom plan view of the auxiliary anchor, according to the preferred embodiment of the present invention.

It is envisioned that shaft 20 may be adjacently mounted directly against a vertically-oriented surface 15a, such as a beam or stud, without the use of shaft receiving anchor 30, as shown in FIG. 8. When employing this particular method, a plurality of screws 40 are inserted through selected foramens 28 of shaft 20, and screwed into the surface, thus effectively mounting shaft 20 thereto.

Referring now to FIGS. 1, and 9-13, in order to vertically support the shaft 20 in a suspended manner below prepoured concrete decking 18, an auxiliary anchor 60 is provided. The auxiliary anchor 60 defines an elongated, tubular body portion 62 defining a closed top end 65 joined by four sidewalls 66 extending perpendicularly therefrom which terminate into an outwardly protruding, planar base 64 having a generally square-shaped configuration. A generally square-shaped central opening 69 is formed within the planar base 64 which provides entrance into a shaft receiving cavity 68. A pair of springpin receiving cavities 72 are formed approximately midway about sidewalls 66 of body portion 62. The springpin receiving cavities 72 jointly define a t-shaped configuration. The planar base 64 includes an aperture 74 formed in each quadrant thereof, through which a nail 76 is intended to be driven.

Figure 13:
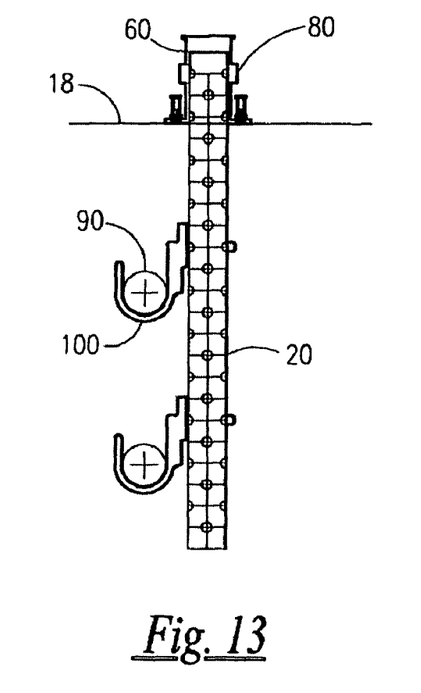
FIG. 13 is a side elevational view of the shaft shown supported in a suspended manner below prepoured concrete decking via the auxiliary anchor.

In order to support shaft 20 in a suspended manner below concrete decking 18, a hole is suitably formed in the concrete 18 so as to form an opening having a size which substantially corresponds to, and yet which is no smaller than the central opening 69 of planar base 64. The auxiliary anchor 60 is placed centrally over the concrete opening, and nails 76 are driven through the apertures 74 of planar base 64, thereby securely mounting auxiliary anchor 60 to concrete decking 18.

Figure 12:
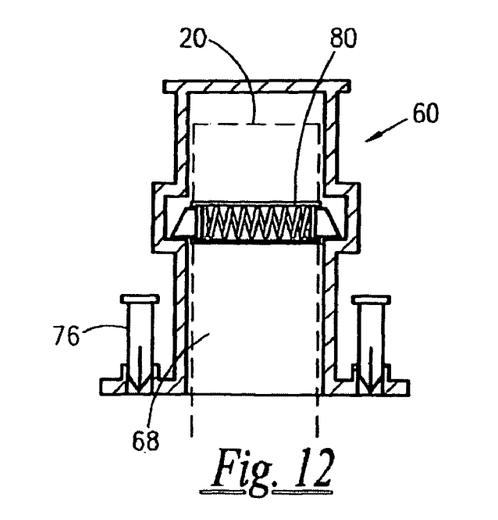
FIG. 12 is cross-sectional view of the auxiliary anchor illustrating protraction of springpin within a springpin receiving cavity, according to the preferred embodiment of the present invention.

An outwardly-biased springpin 80 is suitably disposed perpendicularly through shaft 20, just below the top end 26 thereof. The top end 26 of shaft 20 is inserted through the concrete opening, through central opening 69 of planar base 64, and into the shaft receiving cavity 68, where shoulders of springpin 80 engage the inner sidewalls 66 of body portion 62 facilitating contraction of springpin 80 until reaching springpin receiving cavities 72, whereupon springpin 80 protracts therein in an enclosing relationship, and thereby removably securing shaft 20 within auxiliary anchor 60.

Referring now to FIGS. 1, 8, 13-15, and 16a-16g in order to allow for quick and easy support of construction articles such as pipes 90, hanger elements 100 are disclosed. The hanger elements 100 are adapted to be removably attached to the shaft 20 along various longitudinal positions thereof as selected by user. The hanger elements 100 are adapted and intended to be utilized with shaft 20 when shaft 20 is employed with both the shaft receiving anchor 30 and auxiliary anchor 60.

Figure 14:
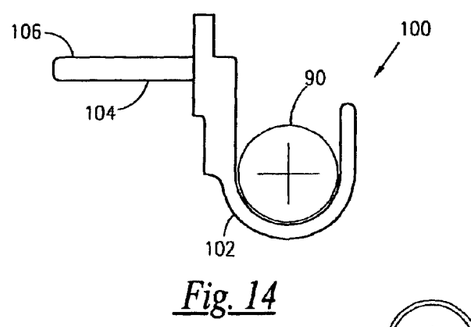
FIG. 14 is side elevational view of the hanger element, according to the preferred embodiment of the present invention.

Each hanger element 100 comprises a C-shaped arm 102 or hook from which an attachment post 104 integrally projects. The attachment post 104 includes a spring biased detent 106. The attachment post 104 of each hanger element 100 is adapted for insertion through the foramens 28, 39 of shaft 20 and shaft receiving sleeve 32, respectively, thus removably attaching the hanger element 100 to shaft 20. The C-shaped arm 102 of hanger element 100 is adapted to support a pipe 90.

Figure 15:
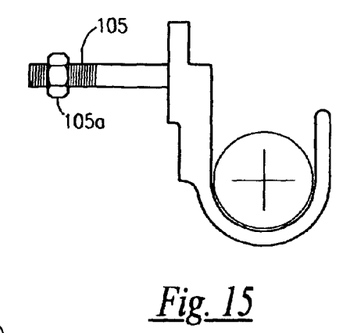
FIG. 15 shows an alternative hanger element having a threaded attachment post with nut.
Figure 16A:
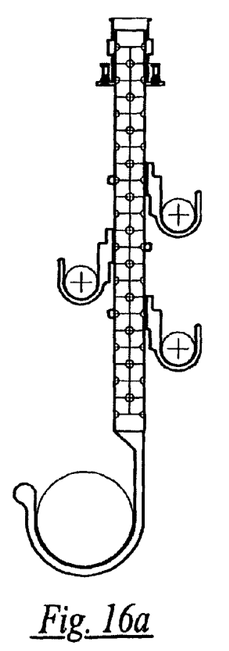
FIGS. 16a-16g illustrate various applications for using the hanger elements.
Figure 16B:
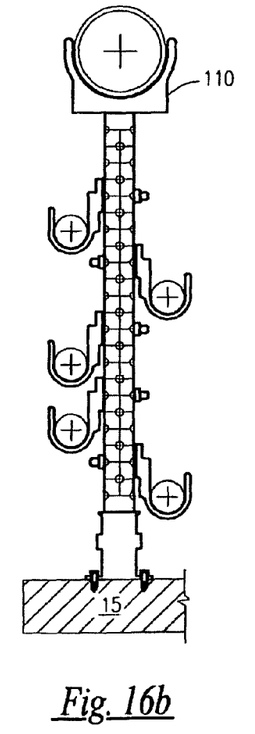
Figure 16C:
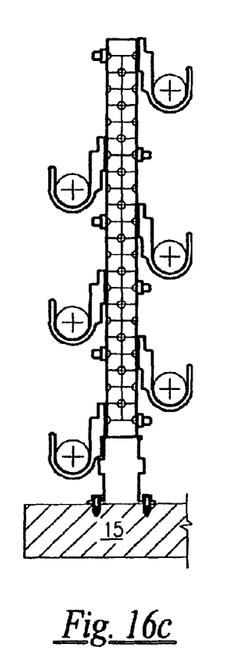
Figure 16D:
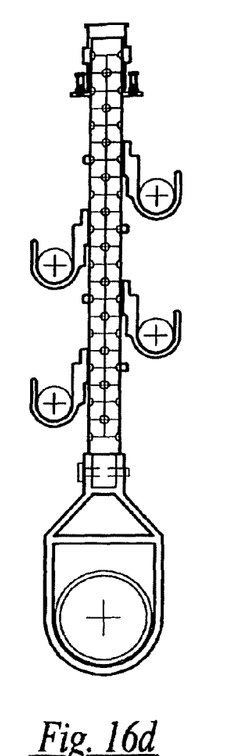
Figure 16E:
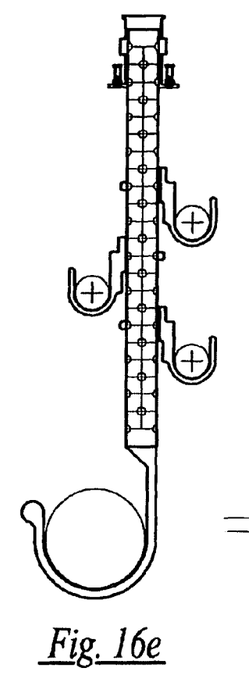
Figure 16F:
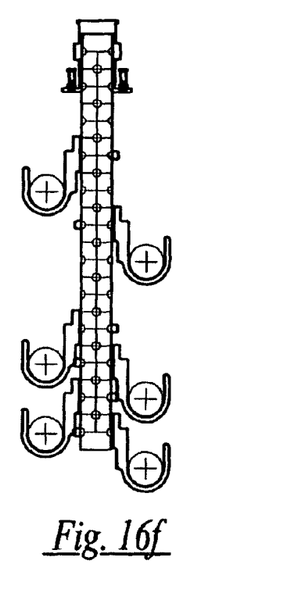
Figure 16G:
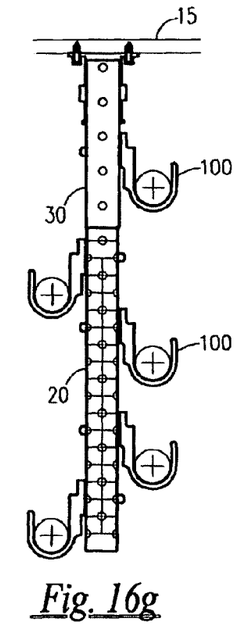
Figure 17:
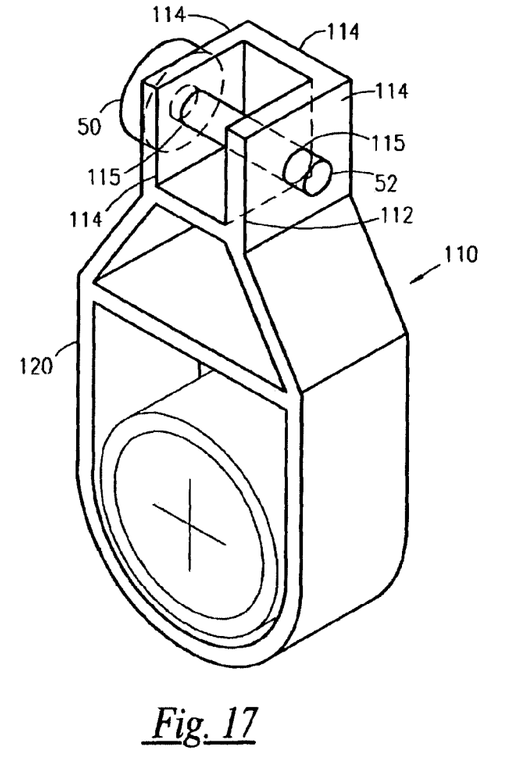
FIG. 17 is front perspective view of the clevis hanger.

Alternatively, a threaded attachment post 105 with nut 105a is envisioned for attaching hanger element 100 to shaft 20.

It is envisioned that the C-shaped arm 102 portion of hanger element 100 is available in a variety of sizes so as to accommodate pipes 90 of various diameters.

Referring now to FIGS. 1, 16b, 17, and 18, a clevis hanger 110 is disclosed and adapted for removable attachment to the open top end 26 or the open bottom end 27 of shaft 20. The clevis hanger 110 includes an elongated neck portion 112 having a generally square configuration defining four vertical sidewalls 114 which extend integrally downward and outward to form a hollow clevis body 120. The clevis body 120 is adapted to support pipe 90 therein. The vertical sidewalls 114 of neck portion 112 form a sleeve adapted to snugly receive the open bottom end 27 of shaft 20. The neck portion 112 is provided with at least two foramens 115 extending therethrough in horizontal alignment.

Figure 18:
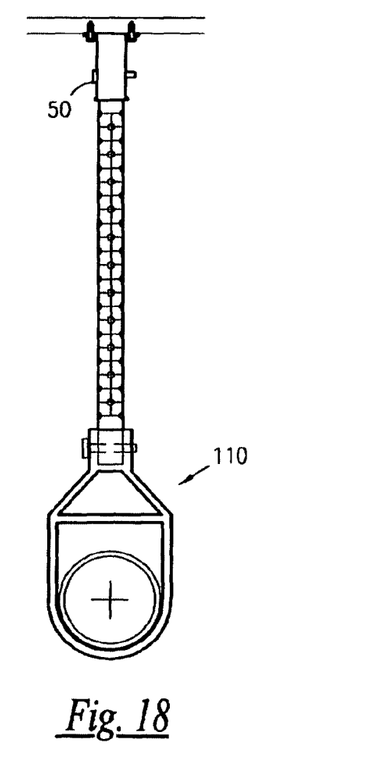
FIG. 18 is a front elevational view of the clevis hanger shown attached to the bottom end of shaft.

Attachment of clevis hanger 110 to shaft 20 is facilitated through the use of a pin 50 which includes a spring-biased detent 52, being inserted through foramens 115 of clevis hanger 110 and through foramens 28 of shaft 20. It is envisioned that the clevis body 120 is available in a variety of sizes.

2. Operation of the Preferred Embodiment

To use the present invention, user inserts a screw 40 through each aperture 31 formed in each quadrant of the planar base portion 34, and screws each screw 40 into wood flooring 15 either thereatop or therebelow as is necessarily required or desired, thereby securely mounting shaft receiving anchor 30 to wood flooring 15. User next inserts shaft 20 within the shaft receiving sleeve 32 and selectively aligns the foramens 28 of shaft 20 with foramens 39 of shaft receiving sleeve 32, whereupon user inserts a pin 50 through respective foramens 28, 39, thereby locking shaft 20 in a desired vertical position. User next attaches hanger elements 100 to the shaft 20 by inserting the attachment post 104 of each hanger element 100 through the foramens 28, 39 of shaft 20 and shaft receiving sleeve 32. Pipes are supported by the C-shaped arms 102 of the hanger elements 100. Additionally, user attaches a clevis hanger 110 to the open bottom end 27 of shaft 20 using a pin 50. Pipe 90 is supported inside the clevis body 120 of clevis hanger 110.

The use of the present invention provides a lightweight, rigid pipe support system which can be quickly and easily mounted atop and below wood flooring or concrete decking that is adapted to provide for a multitude of telescopic adjustment capabilities.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined, by the Claims appended hereto and their equivalents. Therefore, the scope of the invention is to be broadly limited only by the following Claims.

What is claimed is:

1. A telescopic pipe support system comprising:
   an elongated tubular shaft, said elongated tubular includes a front vertical wall opposing a rear vertical wall, a right vertical wall opposing a left vertical wall, and an open top end opposing an open bottom end;
   a shaft receiving anchor, said shaft receiving anchor defining an elongated, tubular shaft receiving sleeve which terminates into an outwardly protruding, planar base portion, said base portion having a generally ware-shaped configuration, and wherein, said shaft receiving sleeve is dimensionally-sized so as to slidably receive said elongated tubular shaft in a snug and intimate manner; and
   hanger elements, said hanger elements are adapted to be removably attached to said elongated, tubular shaft along various longitudinal positions thereof, said hanger elements are adapted to support construction articles,
   wherein said elongated, tubular shaft includes an outwardly-biased springpin suitably disposed perpendicularly through said elongated, tubular shaft just below said top end thereof, wherein said top end of said elongated, tubular shaft is inserted through the concrete opening, through said central opening of said planar base, and into said shaft receiving cavity, where shoulders of said outwardly-biased springpin engage inner walls of said four sidewalls of said body portion facilitating contraction of said outwardly-biased springpin until reaching said pair of said springpin receiving cavities, whereupon said outwardly-biased springpin protracts inside one of said pair of springpin receiving cavities in an enclosing relationship, and thereby removably securing said elongated, tubular shaft within said auxiliary anchor.

2. The telescopic pipe support system of claim 1, wherein said front vertical wall and said rear vertical wall include a plurality of foramens extending therethrough and are vertically aligned in a spaced orientation along an elongated centerline of said front vertical wall and said rear vertical wall, wherein each foramen of said plurality of foramens of said front vertical wall and said rear vertical wall is positioned in horizontal alignment.

3. The telescopic pipe support system of claim 1, wherein said right vertical wall and said left vertical wall include a plurality of foramens extending therethrough and are vertically aligned in a spaced orientation along an elongated centerline of said right vertical wall and said left vertical wall, wherein each foramen of said plurality of foramens of said right vertical wall and said left vertical wall is positioned in horizontal alignment, but said plurality of foramens of said right vertical wall and said left vertical wall are aligned so as to be staggered or offset with respect to said plurality of foramens of said front vertical wall and said rear vertical wall.

4. The telescopic pipe support system of claim 3, wherein said opposing front and rear sidewalls include a plurality of foramens extending therethrough and are vertically aligned in a spaced orientation along an elongated centerline of said opposing front and rear sidewalls, and wherein said plurality of foramens of said opposing front and rear sidewalls are positioned in horizontal alignment.

5. The telescopic pipe support system of claim 3, wherein said opposing right and left sidewalls include a plurality of foramens extending therethrough and are vertically aligned in a spaced orientation along an elongated centerline of said opposing right and left sidewalls, and wherein said plurality of foramens of said opposing right and left sidewalls are positioned in horizontal alignment, but are aligned so as to be staggered or offset with respect to said plurality of foramens of said opposing front and rear sidewalls.

6. The telescopic pipe support system of claim 1, wherein said shaft receiving sleeve defines opposing front and rear sidewalls and opposing right and left sidewalls.

7. The telescopic pipe support system of claim 1, wherein said base portion of said shaft receiving anchor has an aperture formed in each quadrant thereof, through which a screw is inserted and screwed into wood flooring either thereatop or therebelow as is necessarily required or desired, thereby securely mounting said shaft receiving anchor to the wood flooring.

8. The telescopic pipe support system of claim 1, wherein said elongated, tubular shaft is locked within said shaft receiving sleeve in a desired vertical position via a pin.

9. The telescopic pipe support system of claim 8, wherein said elongated, tubular shaft is locked within said shaft receiving sleeve in a desired vertical position via a pin being inserted through said plurality of foramens of said shall receiving sleeve and through said plurality of foramens of said elongated, tubular shaft.

10. The telescopic pipe support system of claim 1, wherein said hanger elements each comprises said C-shaped arm or hook from which an attachment post integrally projects, said attachment post is adapted for insertion through said plurality of foramens of both said shaft receiving sleeve and said elongated, tubular shaft, thus removably attaching said hanger elements to said elongated, tubular shaft, and wherein said C-shaped arm of each of said hanger elements is adapted to support a pipe.

11. The telescopic pipe support system of claim 10, wherein said C-shaped arm of each of said hanger elements is available in a variety of sizes so as to accommodate pipes of various diameters.

12. The telescopic pipe support system of claim 1, further comprising a clevis hanger adapted for removable attachment to an open top end or an open bottom end of said elongated, tubular shaft, wherein said clevis hanger is removably attached to said elongated, tubular shaft via a pin.

13. A telescopic pipe support system comprising:
   an elongated tubular shall, said elongated tubular shaft having a generally square configuration, wherein said elongated, tubular shaft includes a front vertical wall opposing a rear vertical wall, a right vertical wall opposing a left vertical wall, and an open top end opposing an open bottom end, and wherein said front vertical wall and said rear vertical wall include a plurality of foramens extending therethrough and are vertically aligned in a spaced orientation along an elongated centerline of said front vertical wall and said rear vertical wall, wherein each foramen of said plurality of foramens of said front vertical wall and said rear vertical wall is positioned in horizontal alignment, and wherein said right vertical wall and said left vertical wall include a plurality of foramens extending therethrough and are vertically aligned in a spaced orientation along an elongated centerline of said right vertical wall and said left vertical wall, wherein each foramen of said plurality of foramens of said right vertical wall and said left vertical wall is positioned in horizontal alignment, but said plurality of foramens of said right vertical wall and said left vertical wall are aligned so as to be staggered or offset with respect to said plurality of foramens of said front vertical wall and said rear vertical wall;

an auxiliary anchor, said auxiliary anchor is adapted to support said elongated tubular shaft, wherein said auxiliary anchor defines an elongated, tubular body portion defining a closed top end joined by four sidewalls, said four sidewalls extend perpendicularly from said top end, said four sidewalls terminate into an outwardly protruding, planar base having a generally square-shaped configuration; and hanger elements, said hanger elements are adapted to be removably attached to said elongated, tubular shaft along various longitudinal positions thereof, said hanger elements are adapted to support construction articles, wherein said elongated, tubular shaft includes an outwardly-biased springpin suitably disposed perpendicularly through said elongated, tubular shaft just below said tea) end thereof, wherein said top end of said elongated, tubular shaft is inserted through the concrete opening, through said central opening of said planar base, and into said shaft receiving cavity, where shoulders of said outwardly-biased springpin engage inner walls of said four sidewalls of said body portion facilitating contraction of said outwardly-biased springpin until reaching said pair of said springpin receiving cavities, whereupon said outwardly-biased springpin protracts inside one of said pair of springpin receiving cavities in an enclosing relationship, and thereby removably securing said elongated, tubular shall within said auxiliary anchor.

14. The telescopic pipe support system of claim 13, wherein said auxiliary anchor is placed centrally over a concrete opening and nails are driven through said apertures of said planar base, thereby securely mounting said auxiliary anchor to a concrete decking.

15. The telescopic pipe support system of claim 13, further comprising a clevis hanger adapted for removable attachment to an open bottom end of said elongated, tubular shaft, wherein said clevis hanger is removably attached to said elongated, tubular shaft via a pin.

16. A telescopic pipe support system comprising:

an elongated tubular shaft, said elongated tubular shaft having a generally square configuration;

an auxiliary anchor, said auxiliary anchor is adapted to support said elongated tubular shaft, wherein said auxiliary anchor defines an elongated, tubular body portion defining a closed top end joined by four sidewalls, said four sidewalls extend perpendicularly from said top end, said four sidewalls terminate into an outwardly protruding, planar base having a generally square-shaped configuration, wherein said planar base has a generally square-shaped central opening formed therein which provides entrance into a shaft receiving cavity, said planar base includes an aperture formed in each quadrant thereof, through which a nail is intended to be driven, and wherein said four sidewalls have a pair of springpin receiving cavities formed approximately midway about said four sidewalls of said body portion, said pair of springpin receiving cavities jointly define a t-shaped configuration; and hanger elements, said hanger elements are adapted to be removably attached to said elongated, tubular shaft along various longitudinal positions thereof, said hanger elements are adapted to support construction articles.

17. The telescopic pipe support system of claim 16, wherein said elongated, tubular shaft includes a front vertical wall opposing a rear vertical wall, a right vertical wall opposing a left vertical wall, and an open top end opposing an open bottom end, and wherein said front vertical wall and said rear vertical wall include a plurality of foramens extending therethrough and are vertically aligned in a spaced orientation along an elongated centerline of said front vertical wall and said rear vertical wall, wherein each foramen of said plurality of foramens of said front vertical wall and said rear vertical wall is positioned in horizontal alignment, and wherein said right vertical wall and said left vertical wall include a plurality of foramens extending therethrough and are vertically aligned in a spaced orientation along an elongated centerline of said right vertical wall and said left vertical wall, wherein each foramen of said plurality of foramens of said right vertical wall and said right vertical wall is positioned in horizontal alignment, but said plurality of foramens of said right vertical wall and said left vertical wall are aligned so as to be staggered or offset with respect to said plurality of foramens of said front vertical wall and said rear vertical wall.

* * * * *